United States Patent
Kim et al.

(10) Patent No.: US 9,771,145 B2
(45) Date of Patent: Sep. 26, 2017

(54) ROTORCRAFT FLY-BY-WIRE CONTROL LAWS

(71) Applicant: Bell Helicopter Textron Inc., Fort Worth, TX (US)

(72) Inventors: Sung K. Kim, Bedford, TX (US); Christopher M. Bothwell, Grapevine, TX (US); Robert Lee Fortenbaugh, Pantego, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 65 days.

(21) Appl. No.: 15/212,689

(22) Filed: Jul. 18, 2016

(65) Prior Publication Data

US 2017/0137113 A1    May 18, 2017

Related U.S. Application Data (62) Division of application No. 14/577,373, filed on Dec. 19, 2014, now Pat. No. 9,399,511.

(60) Provisional application No. 61/973,294, filed on Apr. 1, 2014.

(51) Int. Cl.
| | |
|---|---|
| *G05D 1/00* | (2006.01) |
| *B64G 1/24* | (2006.01) |
| *B64C 13/50* | (2006.01) |
| *B64C 13/04* | (2006.01) |
| *B64D 43/00* | (2006.01) |
| *B64C 13/12* | (2006.01) |

(52) U.S. Cl.
CPC ............ *B64C 13/503* (2013.01); *B64C 13/04* (2013.01); *B64C 13/12* (2013.01); *B64D 43/00* (2013.01)

(58) Field of Classification Search
CPC ............ B64D 2045/0085; B64D 45/00; B64C 2211/00
USPC ........................................ 701/1–20; 244/164
See application file for complete search history.

(56) References Cited

U.S. PATENT DOCUMENTS

| | | | |
|---|---|---|---|
| 2010/0235109 A1* | 9/2010 | Zhao ...................... | G06Q 10/04 702/34 |
| 2011/0057071 A1* | 3/2011 | Sahasrabudhe ...... | G05D 1/0858 244/17.13 |
| 2011/0208973 A1* | 8/2011 | Jimenez ............. | G06K 17/0022 713/181 |

* cited by examiner

*Primary Examiner* — Muhammad Shafi

(57) ABSTRACT

According to one embodiment, a flight control system includes a pilot control assembly and a flight control computer. The pilot control assembly can receive commands from a pilot. The flight control computer can receive, from the pilot control assembly, a pilot command to change a first flight characteristic, wherein changing the first flight characteristic would result in an expected change to a second flight characteristic. The flight control computer can instruct, in response to the received pilot command, the flight control system to change a first operating condition of the flight control system based on an inherently-coupled relationship between the first flight characteristic and the second flight characteristic. The flight control computer can instruct, in response to the expected change to the second flight characteristic, the flight control system to change a second operating condition of the flight control system.

14 Claims, 9 Drawing Sheets

ROTORCRAFT FLY-BY-WIRE CONTROL LAWS

TECHNICAL FIELD

This invention relates generally to aircraft flight control systems, and more particularly, to rotorcraft fly-by-wire control laws.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to improve pilot control of an aircraft and reduce pilot workload. A technical advantage of one embodiment may include the capability to decouple certain aircraft motions. A technical advantage of one embodiment may include the capability to washout decoupling crossfeeds over a short period of time such that a displacement-trim flight control device substantially reflects the position of the swashplate during steady-state flight but does not reflect the position of the swashplate during short transient periods.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 3A, 3B, and 3C show the trim assemblies of FIGS. 2B and 2C according to one example embodiment;

DETAILED DESCRIPTION OF THE DRAWINGS

Figure 1:
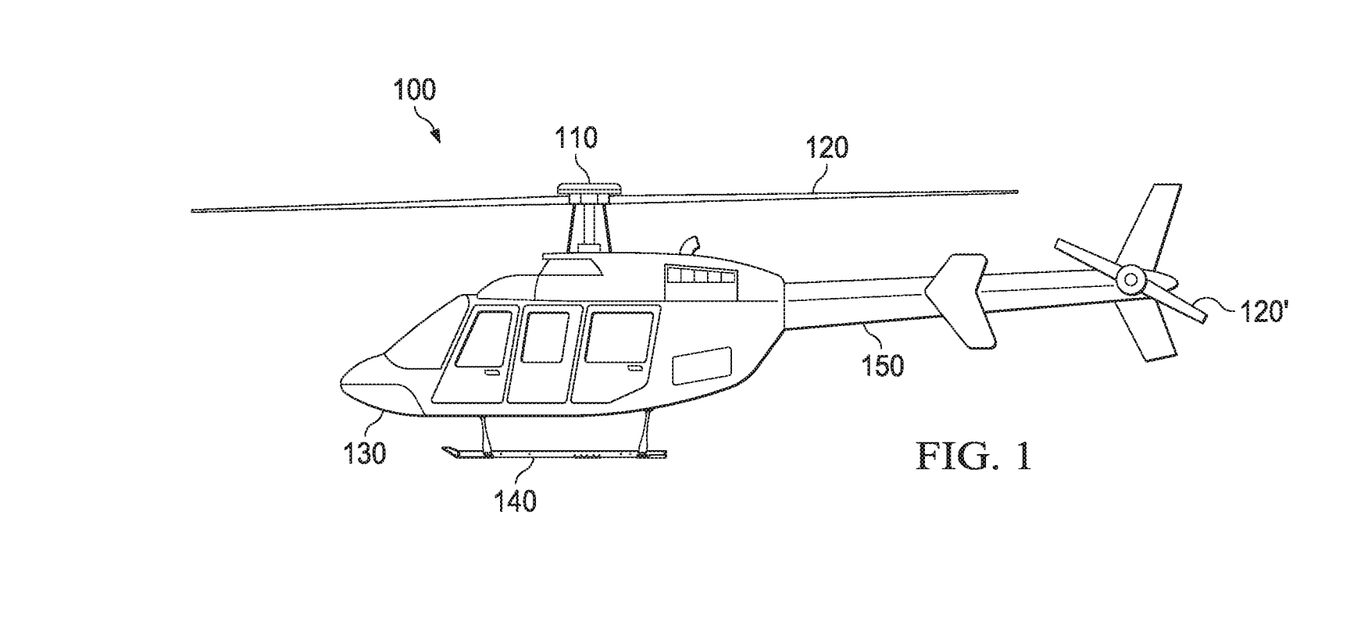
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

A pilot may manipulate one or more pilot flight controls in order to achieve controlled aerodynamic flight. Inputs provided by the pilot to the pilot flight controls may be transmitted mechanically and/or electronically (e.g., via a fly-by-wire flight control system) to flight control devices. Flight control devices may represent devices operable to change the flight characteristics of the aircraft. Examples of flight control devices on rotorcraft 100 may include the control system operable to change the positions of blades 120 and blades 120'.

Figure 2A:
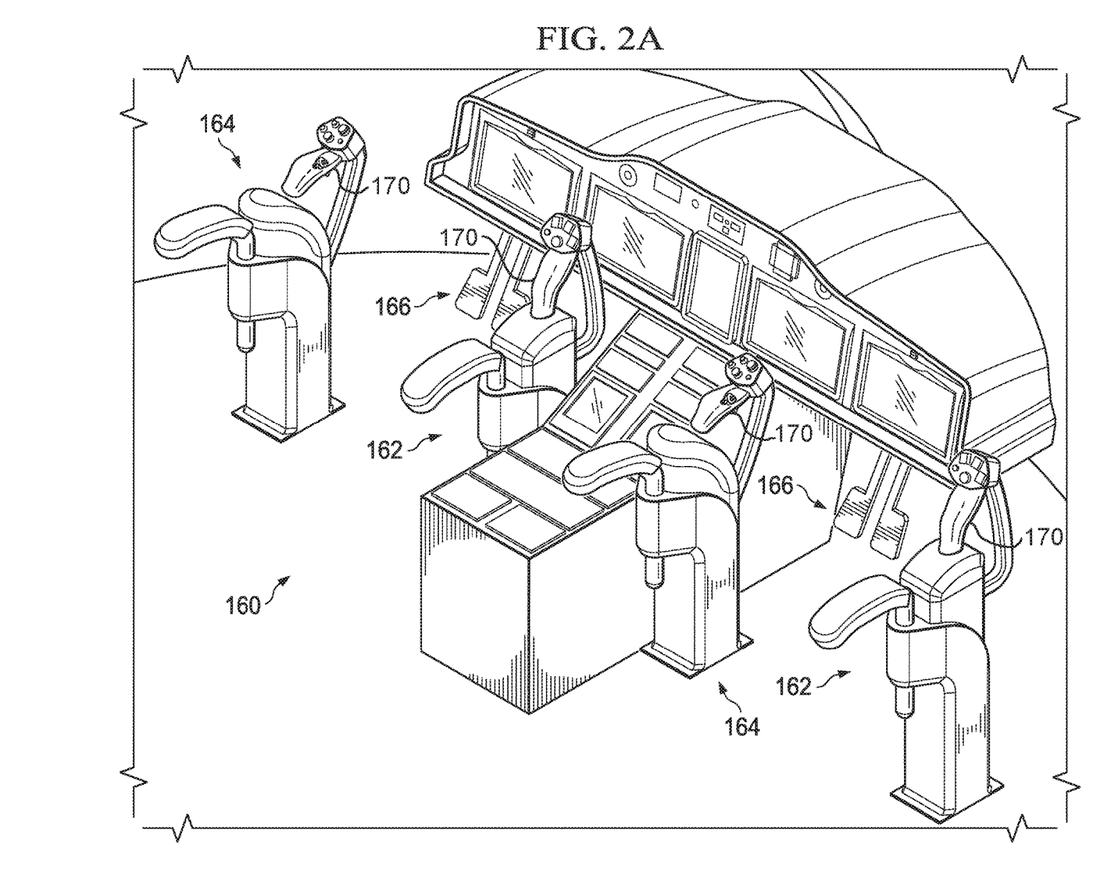
FIG. 2A shows a cockpit configuration of the rotorcraft of FIG. 1 according to one example embodiment.

FIG. 2A shows a cockpit configuration 160 of rotorcraft 100 according to one example embodiment. In the example of FIG. 2A, rotorcraft 100 features at least three sets of pilot flight controls: cyclic control assemblies 162, collective control assemblies 164, and pedal assemblies 166. In the example of FIG. 2A, a set of each pilot flight control is provided for a pilot and a co-pilot (both of which may be referred to as a pilot for the purposes of this discussion).

In general, cyclic pilot flight controls may allow a pilot to impart cyclic motions on blades 120. Cyclic motions in blades 120 may cause rotorcraft 100 to tilt in a direction specified by the pilot. For tilting forward and back (pitch) and/or tilting sideways (roll), the angle of attack of blades 120 may be altered cyclically during rotation, creating different amounts of lift at different points in the cycle.

Collective pilot flight controls may allow a pilot to impart collective motions on blades 120. Collective motions in blades 120 may change the overall lift produced by blades 120. For increasing or decreasing overall lift in blades 120, the angle of attack for all blades 120 may be collectively altered by equal amounts at the same time resulting in ascents, descents, acceleration, and deceleration.

Anti-torque pilot flight controls may allow a pilot to change the amount of anti-torque force applied to rotorcraft 100. As explained above, blades 120' may counter the torque effect created by rotor system 110 and blades 120. Anti-torque pilot flight controls may change the amount of anti-torque force applied so as to change the heading of rotorcraft 100. For example, providing anti-torque force greater than the torque effect created by rotor system 110 and blades 120 may cause rotorcraft 100 to rotate in a first direction, whereas providing anti-torque force less than the torque effect created by rotor system 110 and blades 120 may cause rotorcraft 100 to rotate in an opposite direction. In some embodiments, anti-torque pilot flight controls may change the amount of anti-torque force applied by changing the pitch of blades 120', increasing or reducing the thrust produced by blades 120' and causing the nose of rotorcraft 100 to yaw in the direction of the applied pedal. In some embodiments, rotorcraft 100 may include additional or different anti-torque devices (such as a rudder or a NOTAR anti-torque device), and the anti-torque pilot flight controls may change the amount of force provided by these additional or different anti-torque devices.

In some embodiments, cyclic control assembly 162, collective control assembly 164, and pedal assemblies 166 may be used in a fly-by-wire flight control system. In the example of FIG. 2A, each cyclic control assembly 162 is located to the right of a pilot seat, each collective control assembly 164 is located to the left of a pilot seat, and pedal assembly 166 is located in front of a pilot seat. Teachings of certain embodiments recognize that cyclic control assemblies 162, collective control assemblies 164, and pedal assemblies 166 may be located in any suitable position.

In some embodiments, cyclic control assembly 162, collective control assembly 164, and pedal assemblies 166 may in mechanical communication with trim assembly boxes that convert mechanical inputs into fly-by-wire flight control commands. These trim assembly boxes may include, among other items, measurement devices for measuring mechanical inputs (e.g., measuring input position) and trim motors for back-driving the center positions of the cyclic control assembly 162, collective control assembly 164, and/or pedal assemblies 166.

Figure 2B:
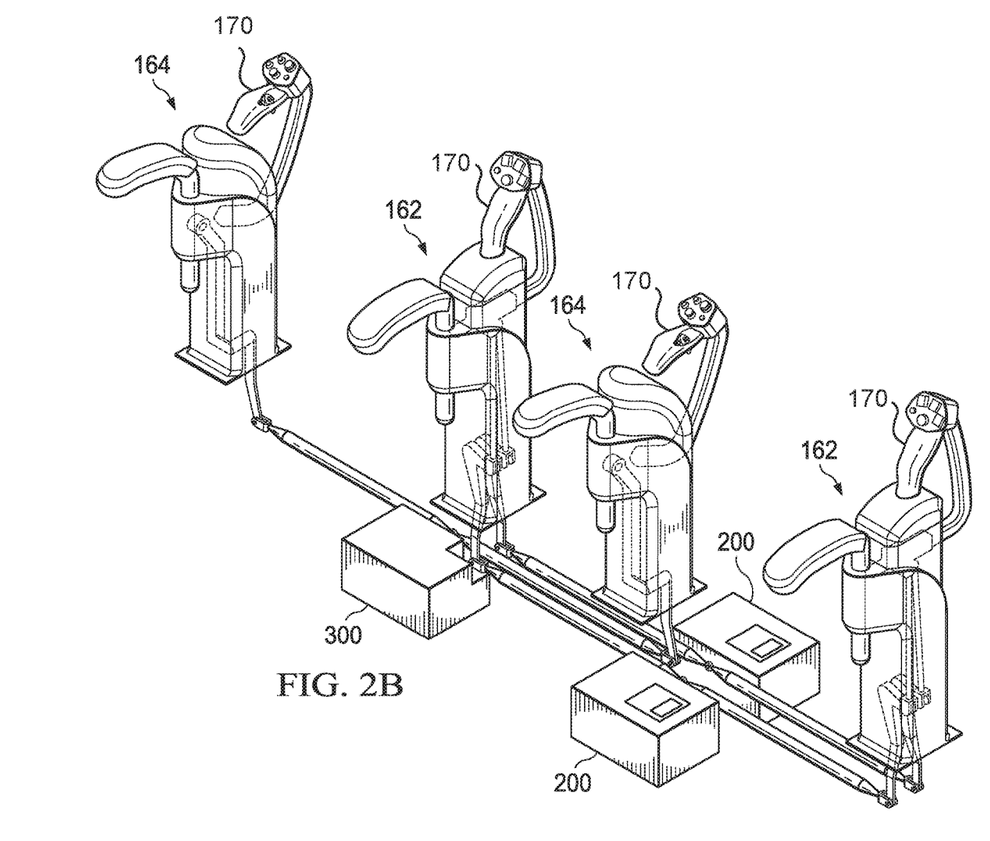
FIG. 2B shows an installation of two cyclic control assemblies and two collective control assemblies of FIG. 2A according to one example embodiment.

For example, FIG. 2B shows an installation of two cyclic control assemblies 162 and two collective control assemblies 164 according to one example embodiment. In this example, the two cyclic control assemblies 162 and two collective control assemblies 164 are coupled to three integrated trim assemblies: two cyclic trim assemblies 200 and a collective trim assembly 300. One of the cyclic trim assemblies 200 manages left/right cyclic tilting movements, and the other cyclic trim assembly 200 manages front/back tilting movements.

In the example of FIG. 2B, cyclic trim assemblies 200 and collective trim assembly 300 are operable to receive and measure mechanical communications of cyclic and collective motions from the pilot. In this example, cyclic trim assemblies 200 and collective trim assemblies 300 may represent components in a fly-by-wire flight control system, and the measurements from cyclic trim assemblies 200 and collective trim assemblies 300 may be sent to a flight control computer operable to instruct rotor system 100 to change a position of blades 120 based on the received measurements. For example, the flight control computer may be in communication with actuators or other devices operable to change the position of blades 120.

Figure 2C:
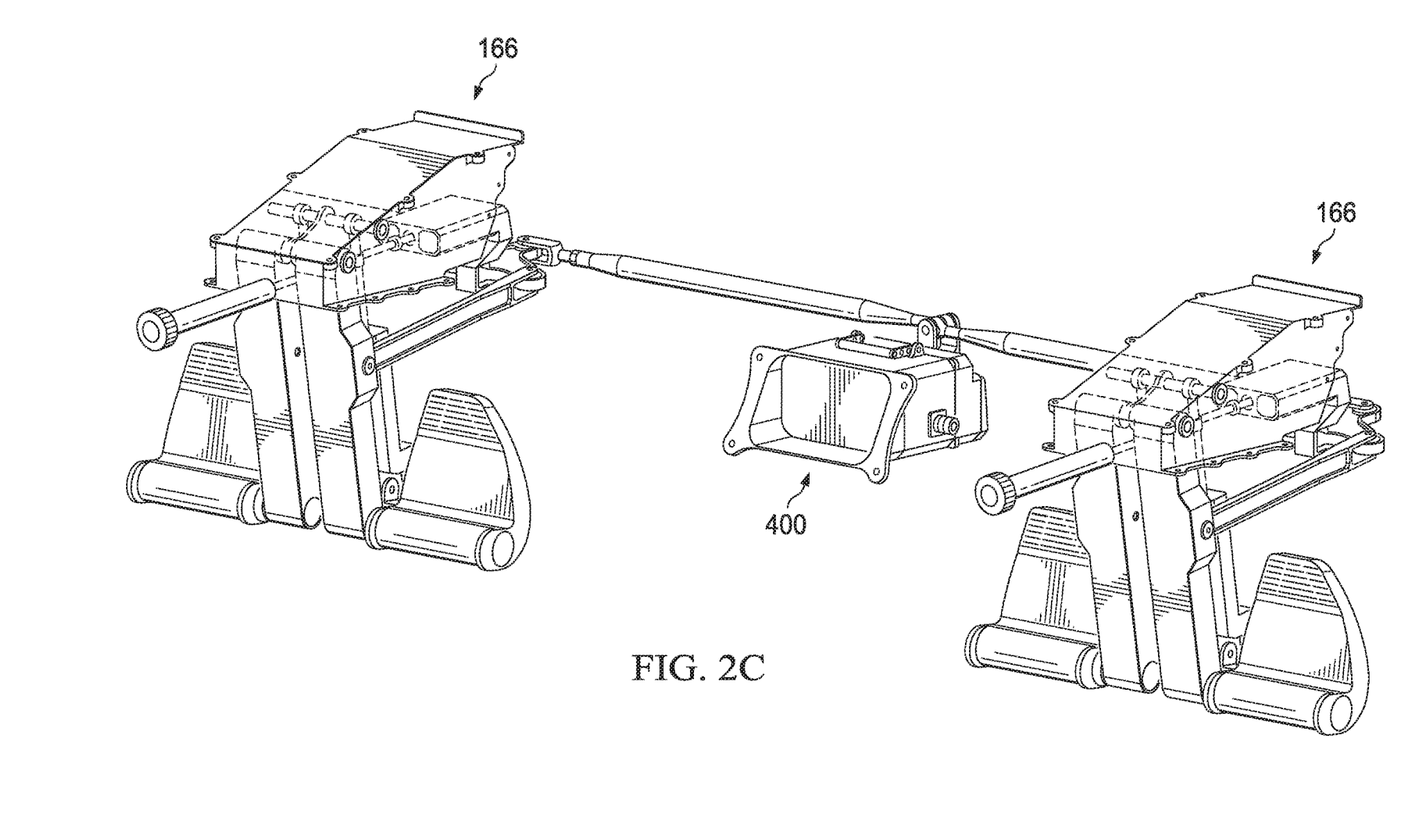
FIG. 2C shows an installation of two pedal assemblies of FIG. 2A according to one example embodiment.

As another example, FIG. 2C shows an installation of pedal assemblies 166 according to one example embodiment. In this example, the two pedal assemblies 166 are coupled to an anti-torque trim assembly 400. In the example of FIG. 2C, pedal linkages are in mechanical communication via a rocker arm and pedal adjustment linkages. The rocker arm is operable to rotate about a point of rotation. In this example, pushing in one pedal causes the pedal adjustment linkage to rotate the rocker arm, which in turn causes the pedal adjustment linkage to push out the other pedal in an opposite direction.

In addition, rotating the rocker arm also causes a trim linkage to reposition a mechanical input associated with anti-torque assembly 400. In this manner, the pilot may mechanically communicate anti-torque commands to anti-torque assembly 400 by moving the pedals. Furthermore, trim linkages couple adjacent pedal assemblies 166 together such that pilot pedals and co-pilot pedals are in mechanical communication.

Figure 3A:
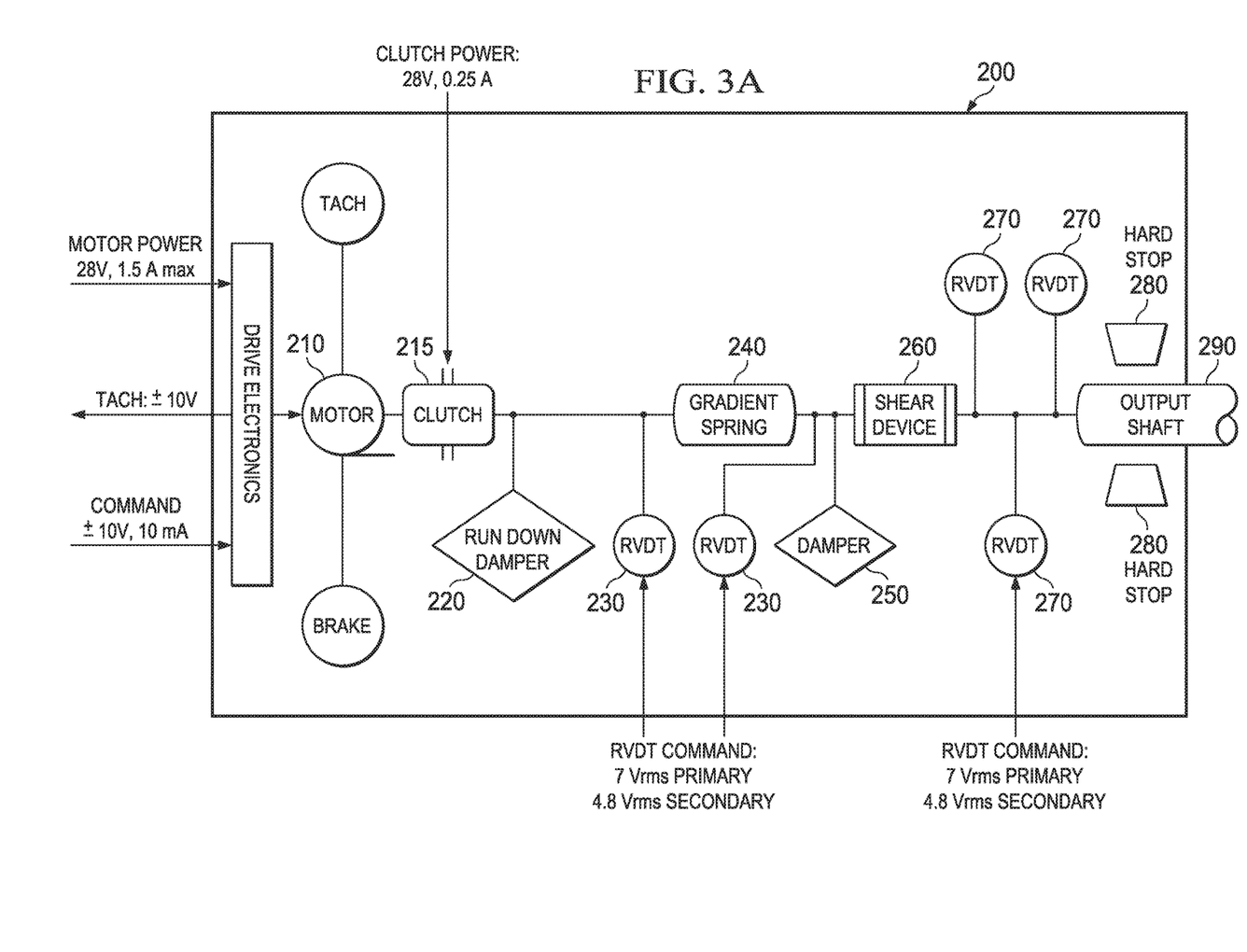
FIG. 3A shows a cyclic trim assembly according to one example embodiment.
Figure 3B:
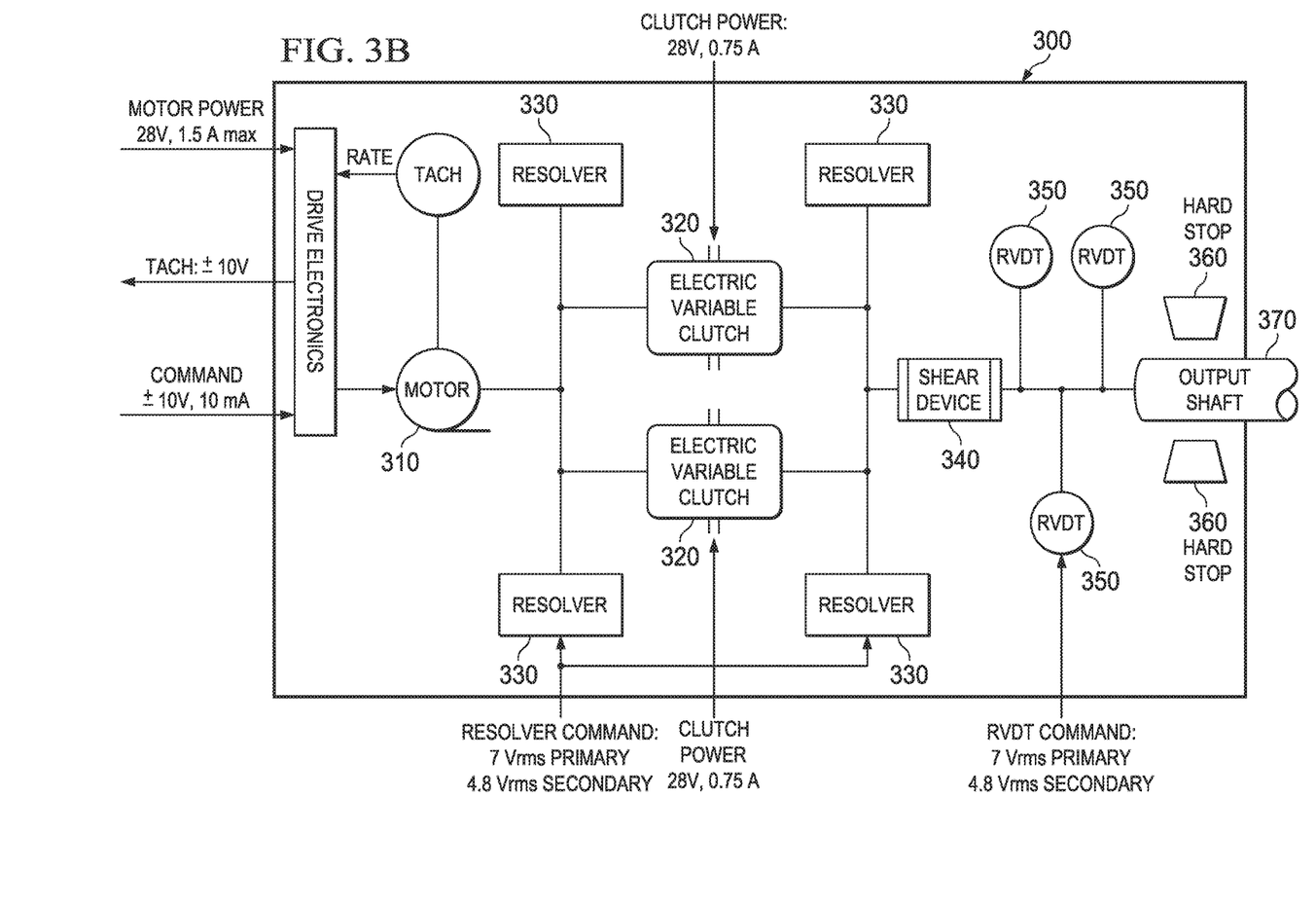
FIG. 3B shows a collective trim assembly according to one example embodiment.
Figure 3C:
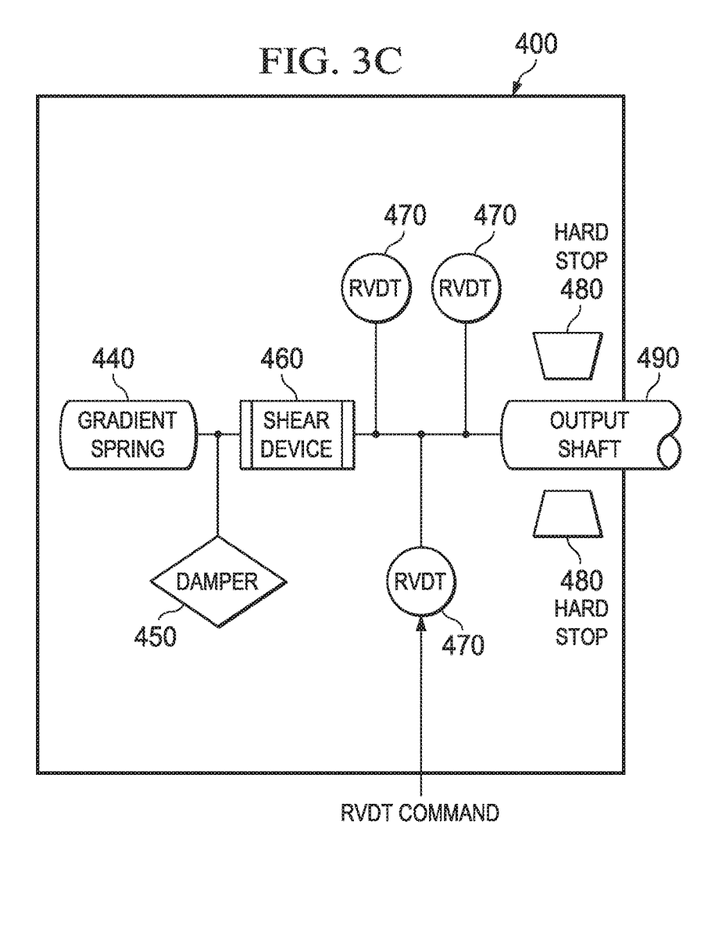
FIG. 3C shows an anti-torque trim assembly according to one example embodiment.

FIGS. 3A, 3B, and 3C show the trim assemblies of FIGS. 2B and 2C according to one example embodiment. FIG. 3A shows cyclic trim assembly 200 according to one example embodiment, FIG. 3B shows collective trim assembly 300 according to one example embodiment, and FIG. 3C shows anti-torque trim assembly 400 according to one example embodiment.

FIG. 3A shows an example embodiment of cyclic trim assembly 200 featuring a trim motor 210, a clutch 215, a run-down damper 220, position measurement devices 230, a gradient spring 240, a damper 250, a shear device 260, position measurement devices 270, mechanical stop devices 280, and an output shaft 290. Although shaft 290 may be described as a single shaft, teachings of certain embodiments recognize that shaft 290 may represent multiple pieces. As one example, shaft 290 may include two shafts separated by gradient spring 240. In another example, shaft 290 may represent a single shaft with a torsion spring attached.

In operation, according to one example embodiment, output shaft 290 and cyclic control assemblies 162 are in mechanical communication such that movement of grip 170 results in movement of output shaft 290 and movement of output shaft 290 likewise results in movement of grip 170. Movement of output shaft 290 may be measured by position measurement devices 230 and 270. The measurements from measurement devices 230 and 270 may be used to instruct rotor system 100 as to how to change the position of blades 120.

In the example of FIG. 3A, cyclic trim assembly 200 may operate in three modes of operation. In the first mode of operation, clutch 215 is engaged, and trim motor 210 drives output shaft 290. This first mode of operation may represent, for example, operation of cyclic trim assembly 200 during auto-pilot operations. In this example, trim motor 210 may drive movement of output shaft 290 so as to drive movement of grip 170 of cyclic control assembly 162. Position measurement devices 230 and 270 may also measure how trim motor 210 drives output shaft 290 and communicate these measurements to rotor system 100.

In the second mode of operation, clutch 215 is disengaged, and the pilot drives output shaft 290 by way of cyclic control assembly 162. In this example, the pilot changes the position of output shaft 290, which may be measured by position measurement devices 230 and 270. Position measurement devices 230 and 270 may measure how the pilot drives output shaft 290 and communicate these measurements to rotor system 100.

In the third mode of operation, clutch 215 is engaged, and trim motor 210 holds its output arm at a trim position so as to provide a ground point for output shaft 290. In this example, the pilot may change the position of output shaft 290 about the trim position set by trim motor 210. When the pilot releases grip 170, grip 170 may move to the trim position corresponding to the position established by trim motor 210. In some embodiments, the first and third modes of operations may be combined such that trim motor 210 moves the trim position during operation.

Thus, trim motor 210 may provide cyclic force and/or trim to cyclic control assembly 162 through output shaft 290. In one example embodiment, trim motor 210 is a 28 volt DC permanent magnet motor. In operation, trim motor 210 may provide an artificial force feel for a flight control system about an anchor point. Clutch 215 provides a mechanism for engaging and disengaging trim motor 210. In one example, clutch 215 is an electric variable clutch.

FIG. 3B shows an example embodiment of collective trim assembly 300 featuring a trim motor 310, clutches 320, resolvers 330, a shear device 340, position measurement devices 350, mechanical stop devices 360, and an output shaft 370. In the example of FIG. 3B, shaft 370 may be coupled to linkages. Although shaft 370 may be described as a single shaft, teachings of certain embodiments recognize that shaft 370 may represent multiple pieces.

In operation, according to one example embodiment, output shaft 370 and collective control assemblies 164 are in mechanical communication such that movement of grip 170 results in movement of output shaft 370 and movement of output shaft 370 likewise results in movement of grip 170. Movement of output shaft 370 may be measured by position measurement devices 350. The measurements from measurement devices 350 may be used to instruct rotor system 100 as to how to change the position of blades 120.

In the example of FIG. 3B, collective trim assembly 300 may operate in three modes of operation. In the first mode of operation, clutches 320 are engaged, and trim motor 310 drives output shaft 370. This first mode of operation may represent, for example, operation of collective trim assembly 300 during auto-pilot operations. In this example, trim motor 310 may drive movement of output shaft 370 so as to drive movement of grip 170 of collective control assembly 164. Position measurement devices 350 may also measure how trim motor 310 drives output shaft 370 and communicate these measurements to rotor system 100.

In the second mode of operation, clutches 320 are disengaged, and the pilot drives output shaft 370 by way of collective control assembly 164. In this example, the pilot changes the position of output shaft 370, which may be measured by position measurement devices 350. Position measurement devices 350 may measure how the pilot drives output shaft 370 and communicate these measurements to rotor system 100.

In the third mode of operation, clutches 320 are engaged, and trim motor 310 holds its output arm at a trim position so as to provide a ground point for output shaft 370. In this example, the pilot may change the position of output shaft 370 about the trim position set by trim motor 310. When the pilot releases grip 170, grip 170 may move to the trim position corresponding to the position established by trim motor 310. In some embodiments, the first and third modes of operations may be combined such that trim motor 310 moves the trim position during operation.

Thus, trim motor 310 may provide collective force and/or trim to collective control assembly 164 through output shaft 370. In one example embodiment, trim motor 310 is a 28 volt DC permanent magnet motor. In operation, trim motor 310 may provide an artificial force feel for a flight control system about an anchor point. Clutches 320 provide a mechanism for engaging and disengaging trim motor 310.

FIG. 3C shows an example embodiment of anti-torque trim assembly 400 featuring a gradient spring 440, a damper 450, a shear device 460, position measurement devices 470, mechanical stop devices 480, and an output shaft 490. Although shaft 490 may be described as a single shaft, teachings of certain embodiments recognize that shaft 490 may represent multiple pieces.

In operation, according to one example embodiment, output shaft 490 and pedal assemblies 166 are in mechanical communication such that movement of the pedals results in movement of output shaft 490 and movement of output shaft 490 likewise results in movement of the pedals. Movement of output shaft 490 may be measured by position measurement devices 470. The measurements from measurement devices 470 may be used to instruct rotor system 100 as to how to change the position of blades 120' (or to change operation of an alternative anti-torque system).

Although cyclic control assembly 162, collective control assembly 164, and pedal assemblies 166 may generally control the cyclic, collective, and anti-torque movements of the aircraft generally, aircraft dynamics may result in a coupling of aircraft motions. As one example, inputting a change in lateral cyclic into cyclic control assembly 162 may result in a change in the pitch moment of rotorcraft 100. This change in the pitch moment may occur even if no longitudinal cyclic input is provided to cyclic control assembly 162. Rather, this change in the pitch moment would be the result of aircraft dynamics. In this example, a pilot may apply a counteracting longitudinal cyclic input to compensate for the change in pitch moment. Thus, the coupling of aircraft motions may increase pilot workload.

Different aircrafts may be associated with different couplings of aircraft motions. For example, a rotorcraft with a canted tail rotor may be associated with a high level of coupling due to the "lift" generated by the canted tail rotor combined with normal coupling of yaw motion to collective pitch and coupling of cyclic inputs of conventional single-rotor rotorcraft. In this example, feedback loops may not be sufficient to compensate for this coupling because feedback loops do not engage until after the coupled response occurs.

Figure 4:
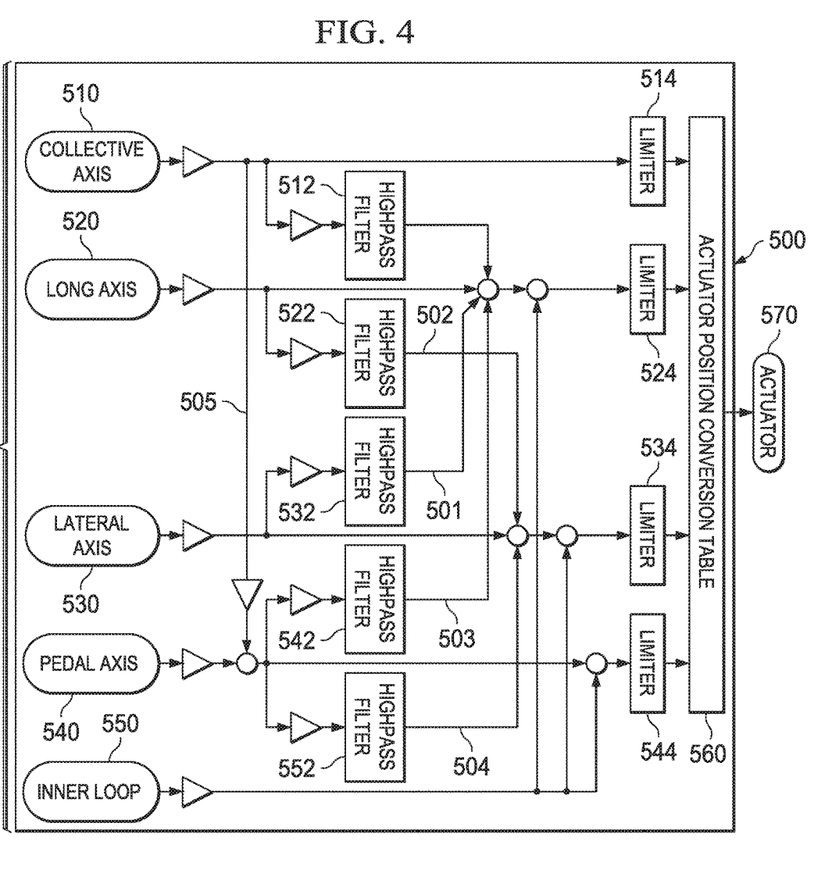
FIG. 4 shows a crossfeed arrangement according to one example embodiment.

Accordingly, teachings of certain embodiments recognize the capability to augment flight control commands with feed-forward control crossfeeds that anticipate the inherent coupling of aircraft motions. FIG. 4 shows a crossfeed arrangement 500 according to one example embodiment. In the example embodiment of FIG. 4, crossfeed arrangement 500 features five inputs: a collective axis input 510, a longitudinal cyclic axis input 520, a lateral cyclic axis input 530, a pedal axis input 540, and an inner loop input 550. Examples of inner loop input 550 will be discussed below with regard to FIG. 5.

In the example of FIG. 4, each input may be crossfed to a different axis. In some examples, high-pass filters—such as high-pass filters 512, 522, 532, 542, and 552—may be used to filter crossfeed signals by allowing high-frequency signals to pass but attenuating frequencies lower than a cutoff frequency. In the example of FIG. 4, fixed gains are applied to the inputs before passing through the high-pass filters. The crossfed signals may then be passed through a limiter—such as a limiter 514, 524, 534, or 544—to an actuator position converter 560, which processes the signals and converts them into instructions for one or more actuators 570. Each Actuator 570 may represent any device that provides flight control inputs to a flight control device. Examples of actuators 570 may include, but are not limited to, a swashplate actuator, a pitch-link actuator, or an on-blade actuator.

The example of FIG. 4 features at least five example crossfeeds. The first example crossfeed 501 is a lateral cyclic to longitudinal cyclic crossfeed based on providing longitudinal cyclic to cancel the pitch moment generated by a change in lateral cyclic. The second example crossfeed 502 is a longitudinal cyclic to lateral cyclic crossfeed based on providing lateral cyclic to cancel the roll moment generated by a change in longitudinal cyclic. The third example crossfeed 503 is a pedal axis (tail rotor collective) to longitudinal cyclic crossfeed based on providing longitudinal cyclic to cancel the pitch moment of the tail rotor collective. The fourth example crossfeed 504 is a tail rotor collective to lateral cyclic crossfeed based on providing lateral cyclic to cancel the roll moment of the tail rotor collective. The fifth example crossfeed 505 is a main rotor collective to tail rotor collective crossfeed based on providing tail rotor collective to cancel the yaw moment of the main rotor collective.

Although the example of FIG. 4 features five crossfeeds, teachings of certain embodiments recognize that more, fewer, or different crossfeeds may be utilized. In general, crossfeeds may be utilized whenever a pilot provides a command to change a first flight characteristic, wherein changing the first flight characteristic would result in an expected change to a second flight characteristic. In this example, the crossfeed may result in an instruction to change a first operating condition of the flight control system in response to the received pilot command and an instruction to change a second operating condition in response to the expected change to the second flight characteristic. This second instruction could at least partially offset the expected change to the second flight characteristic.

Teachings of certain embodiments recognize that applying crossfeeds to "decouple" an aircraft with coupled flight dynamics may reduce pilot workload by automatically applying crossfeed commands without pilot intervention. For example, in some embodiments, applying decoupling crossfeeds may reduce or eliminate the need for the pilot to apply commands through the pilot controls that are intended to at least partially offset the coupled motion of the aircraft. In some scenarios, the flight control system may apply these crossfeeds input faster than the pilot could manually because the crossfeeds may anticipate the inherent coupling of aircraft motions.

Application of crossfeeds in a fly-by-wire flight control system, however, could change the pilot experience. For example, cyclic control assembly 162 could be configured to operate as a displacement-trim device such that movements of the longitudinal stick correlate to the position of the swashplate. In this example, applying crossfeeds to anticipate the inherent coupling of aircraft motions may result in the stick position failing to represent the position of the swashplate unless the trim motor backdrives the pilot control device to match the swashplate position. Continuously driving the stick, especially at high frequency due to aircraft dynamics, however, may increase the workload of the pilot trim system and may increase pilot fatigue by transferring transient motions of the swashplate to the pilot's hand and forcing the pilot's hand to follow the stick as the swashplate moves.

Accordingly, teachings of certain embodiments recognize the capability to washout crossfeeds over a short period of time such that a displacement-trim flight control device substantially reflects the position of the swashplate during steady-state flight but does not reflect the position of the swashplate during short transient periods. For example, the trim motor may drive the stick in certain conditions (e.g., during auto-pilot controlled flight or establishing a new trim position), but the flight control computer may be configured to not command the trim motor to move the pilot control stick in response to application of the crossfeed. In some embodiments, the flight control computer is configured to command the motor to move the pilot control stick based on positions of the swashplate during steady state conditions and is configured to not command the motor to move the pilot control stick during transitory conditions.

In one example embodiment, the washout time period of time is less than ten seconds (e.g., 3-5 seconds). In some embodiments, this washout time period begins when the crossfeed is first applied. In other embodiments, this washout time period begins after the aircraft returns to steady state. In some embodiments, the aircraft returns to the same steady state condition from before the crossfeed was applied; in other embodiments, a new steady state condition is established after the crossfeed is applied.

Elements of crossfeed arrangement 500 may be implemented at least partially by one or more computer systems 10. All, some, or none of the components of crossfeed arrangement 500 may be located on or near an aircraft such as rotorcraft 100.

Users 5 may access crossfeed arrangement 500 through computer systems 10. For example, in some embodiments, users 5 may provide flight control inputs that may be processed using a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Figure 5:
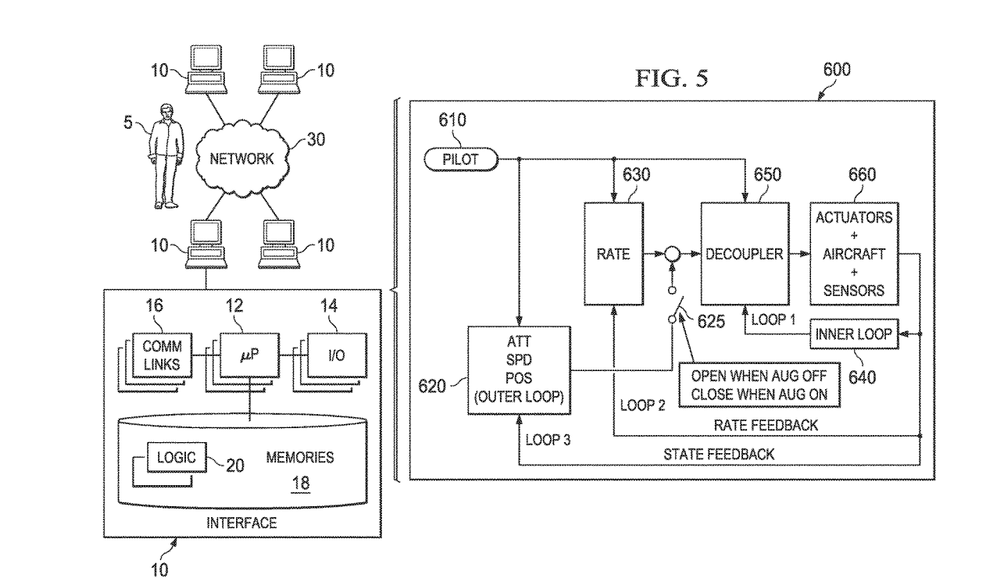
FIG. 5 shows a three-loop flight control system according to one example embodiment.

FIG. 5 shows a three-loop flight control system 600 according to one example embodiment. Like the crossfeed arrangement 500 of FIG. 4, elements of three-loop flight control system 600 may be implemented at least partially by one or more computer systems 10. All, some, or none of the components of three-loop flight control system 600 may be located on or near an aircraft such as rotorcraft 100.

The three-loop flight control system 600 of FIG. 5 features a pilot input 610, an outer loop 620, a rate (middle) loop 630, an inner loop 640, a decoupler 650, and aircraft equipment 660. Examples of inner loop 640 and decoupler 650 may include, but are not limited to, the crossfeed arrangement 500 and the inner loop 550 of FIG. 4. In addition, examples of aircraft equipment 660 may include, but are not limited to, actuator position converter 560 and actuators 570 of FIG. 4.

In the example of FIG. 5, a three-loop design separates the inner stabilization and rate feedback loops from outer guidance and tracking loops. The control law structure primarily assigns the overall stabilization task to inner loop 640. Next, middle loop 630 provides rate augmentation. Outer loop 620 focuses on guidance and tracking tasks. Since inner loop 640 and rate loop 630 provide most of the stabilization, less control effort is required at the outer loop level. In the example of FIG. 5, a switch 625 is provided to turn third-loop flight augmentation on and off.

In some embodiments, the inner and rate loops include a set of gains and filters applied to roll/pitch/yaw 3-axis rate gyro and acceleration feedback sensors. Both the inner and rate loops may stay active, independent of the various outer loop hold modes. Outer loop 620 may include cascaded layers of loops, including an attitude loop, speed loop, position loop, vertical speed loop, altitude loop, and heading loop.

In the example of FIG. 5, the sum of the inner loop 640, rate loop 630, and outer loop 620 go through decoupler 650. Decoupler 650 approximately decouples all 4-axes (pitch, roll, yaw, and vertical) such that, for example, the forward longitudinal stick input does not require the pilot to push the stick diagonally. Similarly, a collective pull increases torque and results in an increased anti-torque requirement. Decoupler 650 may provide both the necessary pedal and a portion of cyclic if rotorcraft 100 features a canted tail rotor.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 3 of 35 U.S.C. §112 as it exists on the date of filing hereof unless the words "means for" or "step for" are explicitly used in the particular claim.

What is claimed is:

1. A flight control system, comprising:
    a pilot control assembly configured to receive commands from a pilot, wherein the flight control system is a fly-by-wire flight control system in electrical communication with the pilot control assembly; and
    a flight control computer is in electrical communication between the flight control system and the pilot control assembly, the flight control computer configured to:

receive, from the pilot control assembly, a pilot command to change a first flight characteristic, wherein changing the first flight characteristic would result in an expected change to a second flight characteristic;

instruct, in response to the received pilot command, the flight control system to change a first operating condition of the flight control system based on an inherently-coupled relationship between the first flight characteristic and the second flight characteristic; and instruct, in response to the expected change to the second flight characteristic, the flight control system to change a second operating condition of the flight control system to at least partially offset the expected change to the second flight characteristic such that the flight control system at least partially decouples aircraft motions that are inherently coupled.

2. The flight control system of claim 1, wherein the flight control computer is configured to instruct the flight control module to transmit an instruction to change the second operating condition of the flight control system by instructing the flight control system to transmit an instruction to change the second operating condition by a first amount and then washing out the change to the second operating condition over a period of time.

3. The flight control system of claim 2, wherein the period of time is less than ten seconds.

4. The flight control system of claim 1, wherein:

the rotorcraft is operating in a first steady state condition prior to transmitting an instruction to change the first operating condition of the flight control system;

the rotorcraft is operating in a second steady state condition after transmitting an instruction to change the first operating condition of the flight control system; and the flight control computer is configured to instruct the flight control module to transmit an instruction to change the second operating condition of the flight control system by instructing the flight control module to transmit an instruction to change the second operating condition by a first amount and then washing out the change to the second operating condition over a period of time.

5. The flight control system of claim 4, wherein operating in the second steady state comprises returning to the first steady state.

6. The flight control system of claim 1, wherein:

the pilot control assembly comprises a pilot control stick and a motor configured to move the pilot control stick in response to commands from the flight control computer; and the flight control computer is configured to not command the motor to move the pilot control stick in response to instructing the flight control system to change the second operating condition of the flight control system.

7. The flight control system of claim 6, wherein the flight control computer is configured to command the motor to move the pilot control stick based on positions of the swashplate during steady state conditions and is configured to not command the motor to move the pilot control stick during transitory conditions.

8. A method for decoupling motions of a rotorcraft, comprising:

receiving, from a pilot control assembly, a pilot command to change a first flight characteristic, wherein changing the first flight characteristic would result in an expected change to a second flight characteristic;

instructing, in response to the received pilot command, the flight control system to change a first operating condition of the flight control system based on an inherently-coupled relationship between the first flight characteristic and the second flight characteristic; and instructing, in response to the expected change to the second flight characteristic, the flight control system to change a second operating condition of the flight control system to at least partially offset the expected change to the second flight characteristic such that the flight control system at least partially decouples aircraft motions that are inherently coupled.

9. The method of claim 8, wherein instructing the flight control system to change the second operating condition comprises instructing the flight control system to change the second operating condition by a first amount and then washing out the change to the second operating condition over a period of time.

10. The method of claim 9, wherein the period of time is less than ten seconds.

11. The method of claim 8, wherein:

the rotorcraft is operating in a first steady state condition prior to instructing the flight control system to change the first operating condition of the flight control system;

the rotorcraft is operating in a second steady state condition after instructing the flight control system to change the first operating condition of the flight control system; and instructing the flight control system to change the second operating condition comprises instructing the flight control system to change the second operating condition by a first amount and then washing out the change to the second operating condition over a period of time.

12. The method of claim 11, wherein operating in the second steady state comprises returning to the first steady state.

13. The method of claim 8, wherein the pilot control assembly comprises a pilot control stick and a motor configured to move the pilot control stick in response commands to from the flight control computer, the method further comprising:

preventing the flight control system from commanding the motor to move the pilot control stick in response to instructing the flight control system to change the second operating condition of the flight control system.

14. The method of claim 13, wherein preventing the flight control system from commanding the motor to move the pilot control stick comprises commanding the motor to move the pilot control stick based on positions of the swashplate during steady state conditions and preventing the flight control system from commanding the motor to move the pilot control stick during transitory conditions.

* * * * *